(12) United States Patent
Segura

(10) Patent No.: US 6,485,238 B2
(45) Date of Patent: Nov. 26, 2002

(54) RESTRAINT APPARATUS

(75) Inventor: B. Javier Segura, Upland, CA (US)

(73) Assignee: Pemco Aviation Group, Corona, CA (US)

( * ) Notice: Subject to any disclaimer, the term of this patent is extended or adjusted under 35 U.S.C. 154(b) by 0 days.

(21) Appl. No.: 09/811,240

(22) Filed: Mar. 16, 2001

(65) Prior Publication Data

US 2002/0131837 A1 Sep. 19, 2002

(51) Int. Cl.$^7$ .................................................. B60P 7/08
(52) U.S. Cl. ............................ 410/69; 410/77; 410/78; 410/79; 410/80; 410/92
(58) Field of Search ............................. 410/94, 69, 77, 410/78, 79, 80, 92, 105; 244/118.1, 137.1; 414/536; 248/500, 503

(56) References Cited

U.S. PATENT DOCUMENTS

| | | | |
|---|---|---|---|
| 3,210,038 A | | 10/1965 | Bader et al. |
| 3,262,588 A | | 7/1966 | Davidson |
| 3,377,040 A | * | 4/1968 | Hansen .................... 410/79 |
| 3,778,012 A | * | 12/1973 | Fernandez ................ 410/69 |
| 3,796,397 A | | 3/1974 | Alberti |
| 3,810,534 A | * | 5/1974 | Prete, Jr. ................... 410/69 |
| 3,986,460 A | * | 10/1976 | Voigt et al. ............... 410/69 |
| 4,121,789 A | | 10/1978 | Lent et al. |
| 4,144,821 A | * | 3/1979 | Lang ........................ 410/79 |
| 4,234,278 A | | 11/1980 | Harshman et al. ........ 410/69 |
| 4,349,302 A | | 9/1982 | Ferguson, Jr. ............ 410/69 |
| 4,557,648 A | | 12/1985 | Koch et al. .............. 410/78 |
| 4,583,896 A | * | 4/1986 | Vogg et al. ............... 410/69 |
| 4,696,609 A | * | 9/1987 | Cole ........................ 410/69 |
| 5,112,173 A | * | 5/1992 | Eilenstein et al. ......... 410/79 |
| 5,433,564 A | | 7/1995 | Sudseth .................... 410/77 |
| 5,573,359 A | * | 11/1996 | Moradians ................ 410/69 |
| 5,871,317 A | * | 2/1999 | Huber et al. .............. 410/79 |
| 6,193,453 B1 | * | 2/2001 | Kernkamp ................ 410/79 |
| 6,270,300 B1 | * | 8/2001 | Huber et al. .............. 410/69 |
| 6,318,938 B1 | * | 11/2001 | Araujo ..................... 410/79 |

* cited by examiner

Primary Examiner—Stephen T. Gordon
(74) Attorney, Agent, or Firm—James E. Brunton

(57) ABSTRACT

An aircraft cargo carrier restraint device that is constructed so that it cannot be accidentally moved from extended, pallet locking position to a retracted position. The device embodies locking pawls of unique design that positively preclude movement of the pawls into a retracted position unless a specific sequence of operation is followed. One of the locking pawls includes a locking notch and the other of the locking pawls includes a locking protuberance, which is closely received within the locking notch so as to positively prevent accidental downward movement of the pawls into their lowered position.

20 Claims, 6 Drawing Sheets

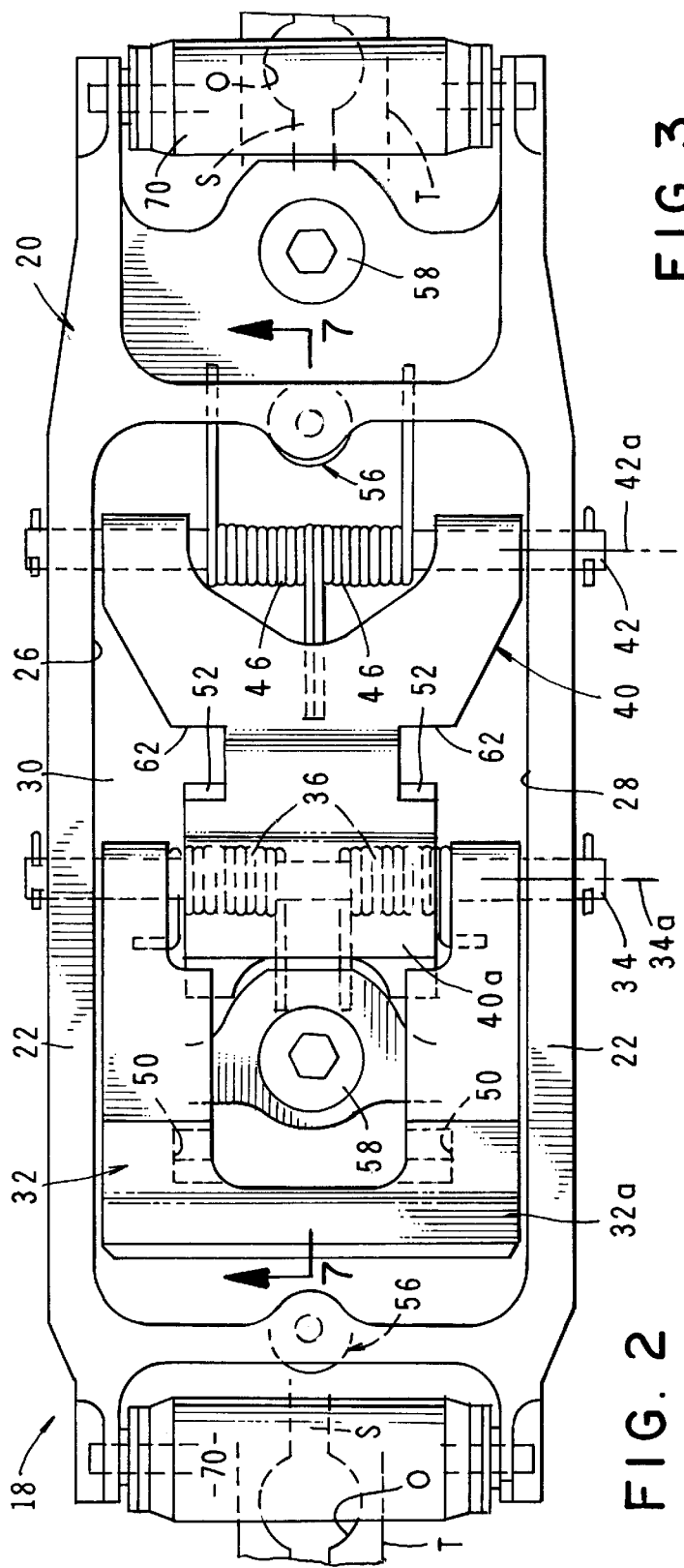
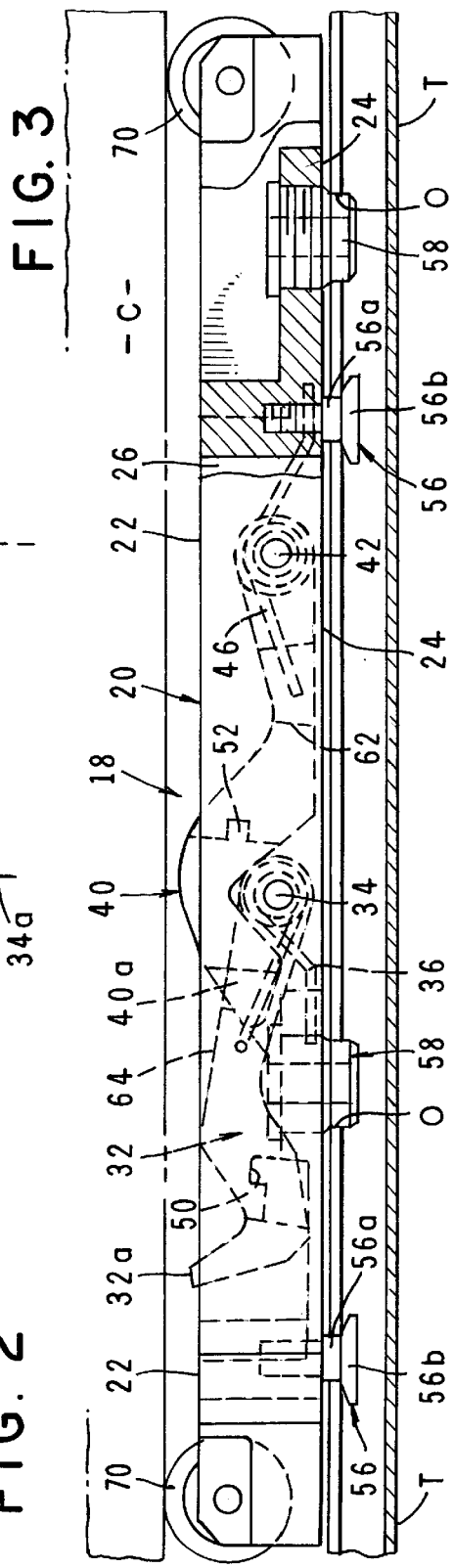
FIG. 2
FIG. 3

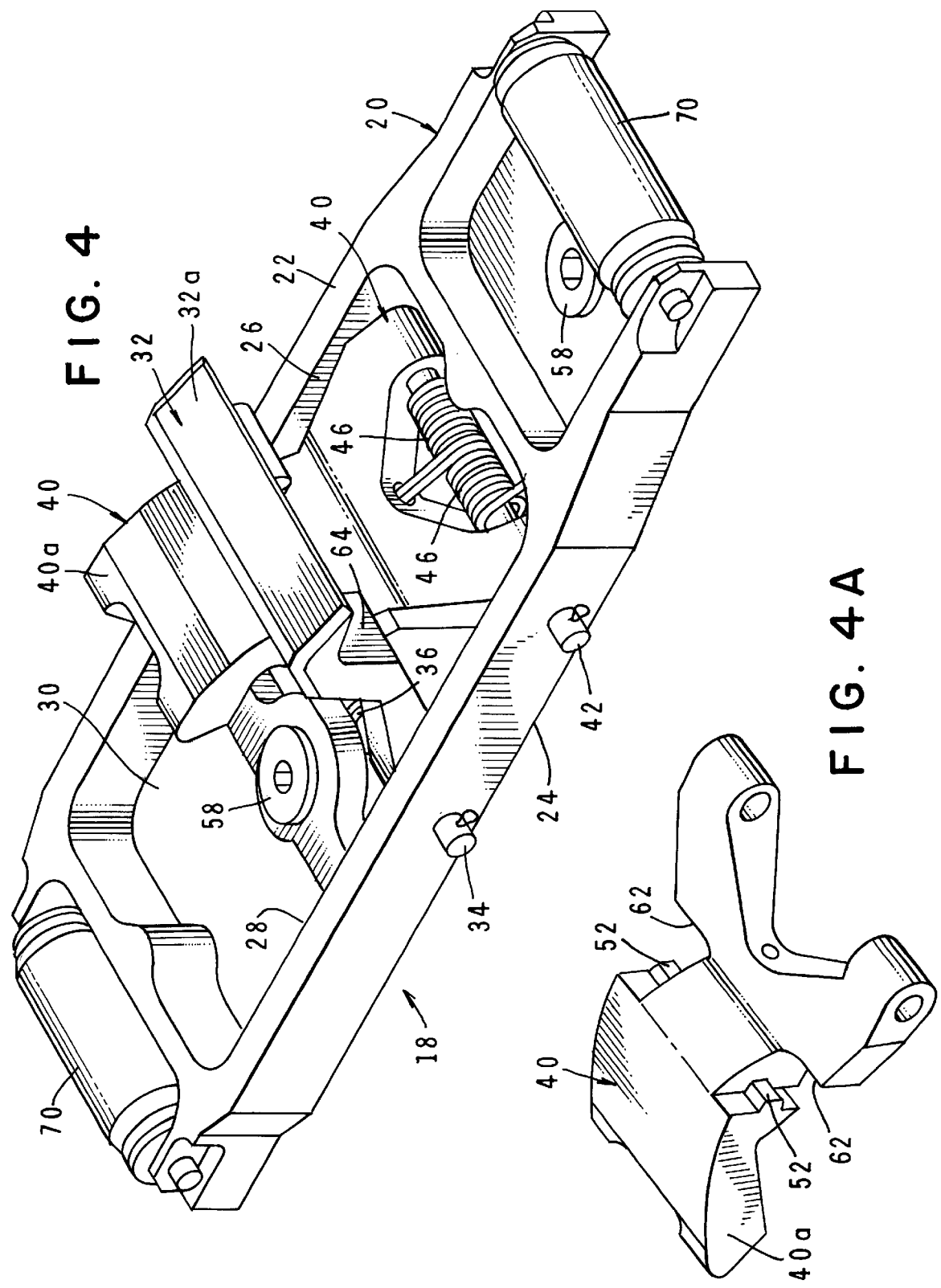

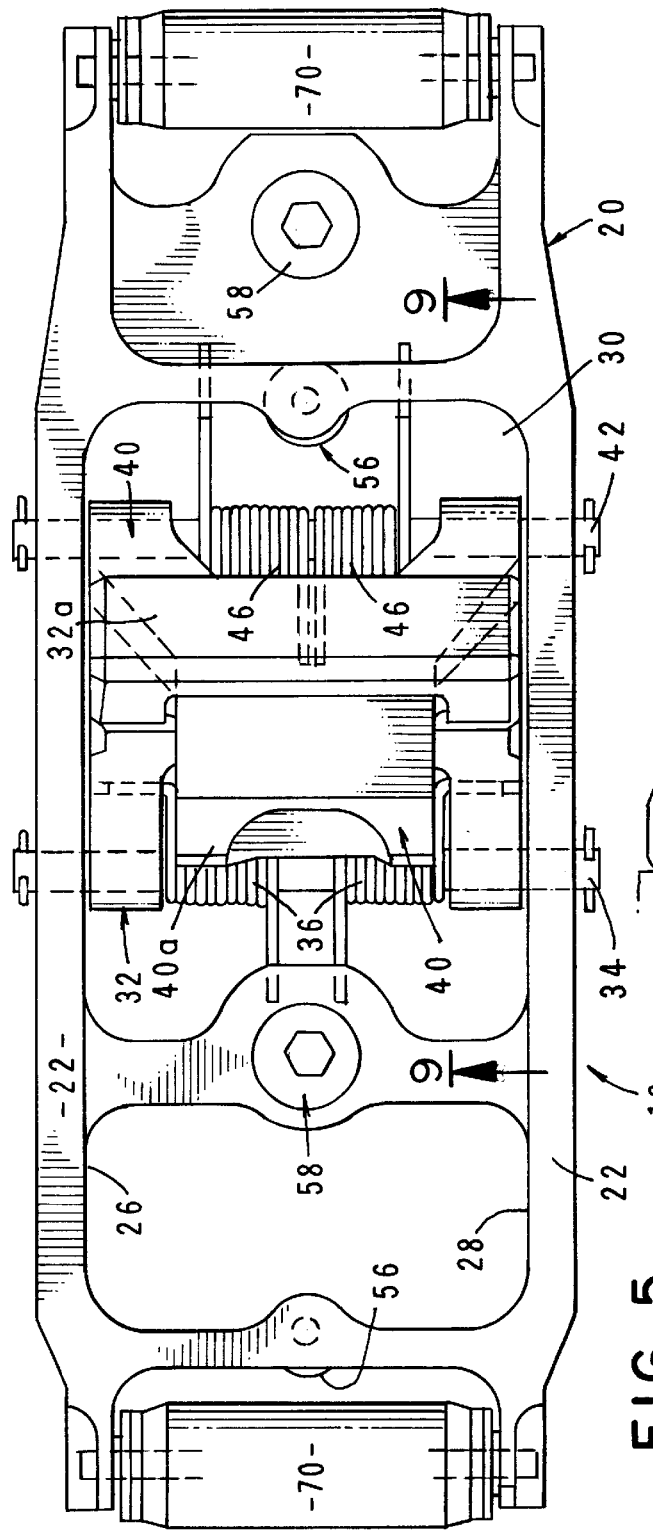
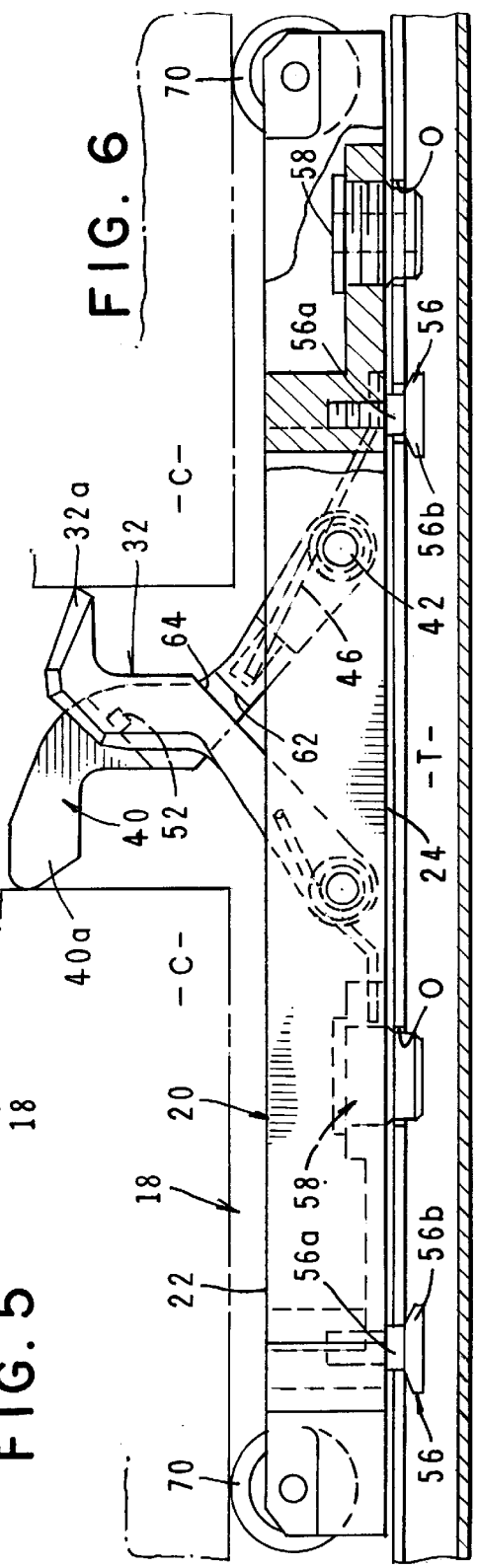

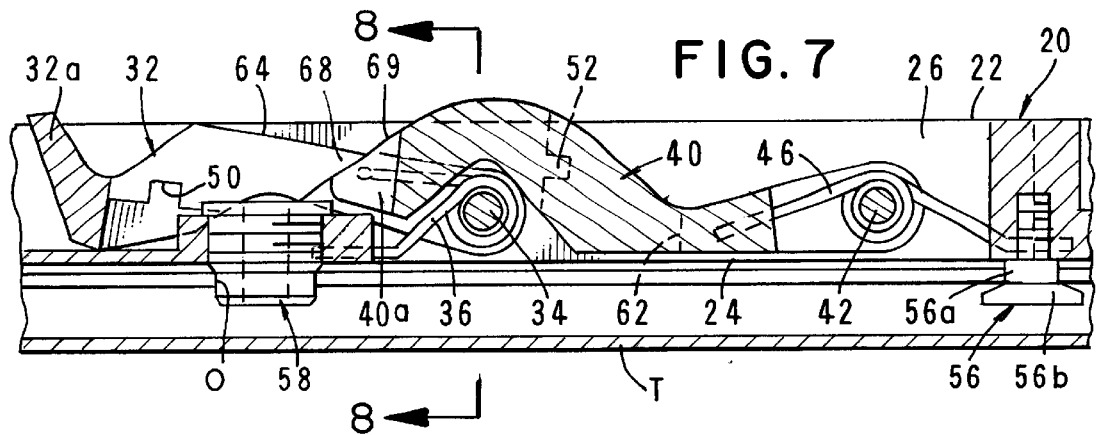
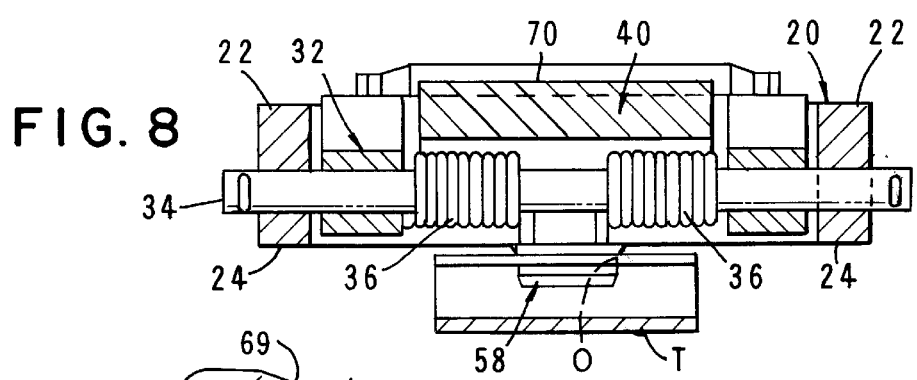
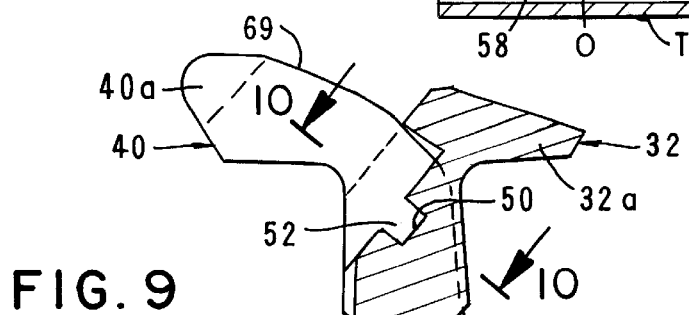
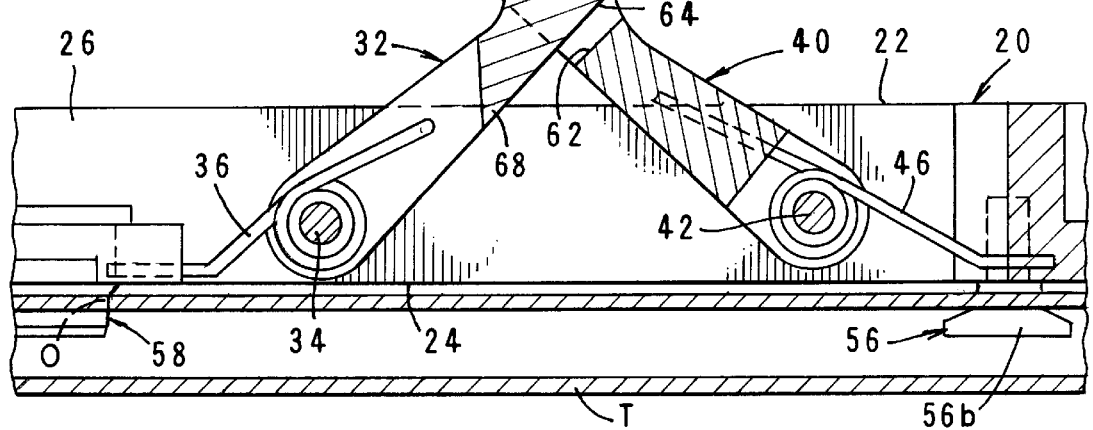

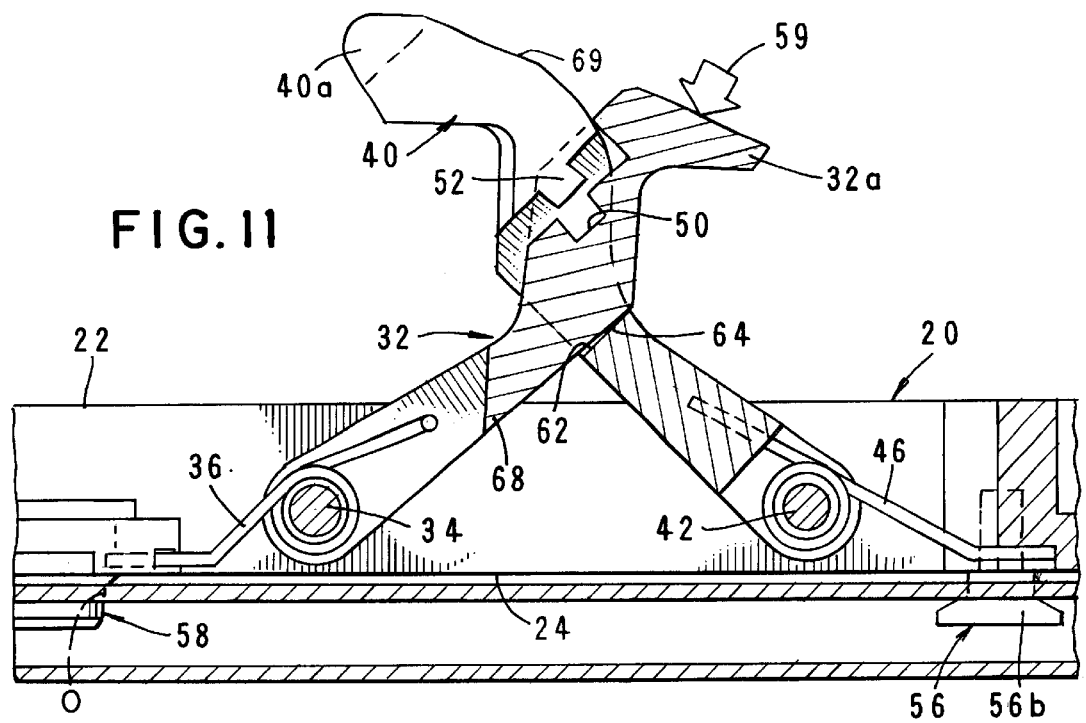
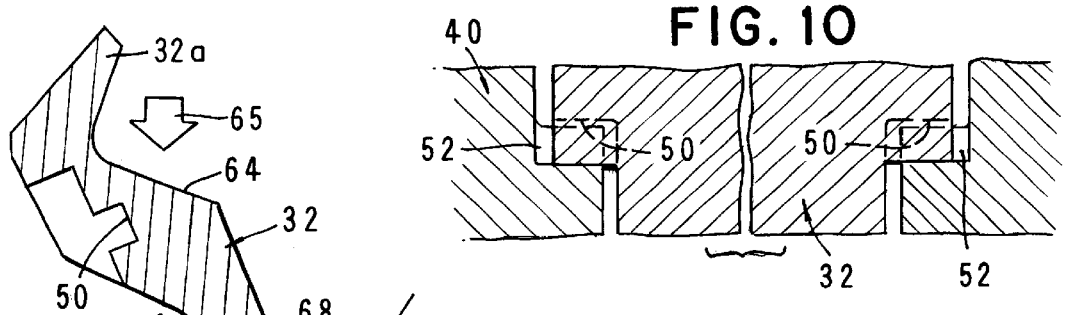
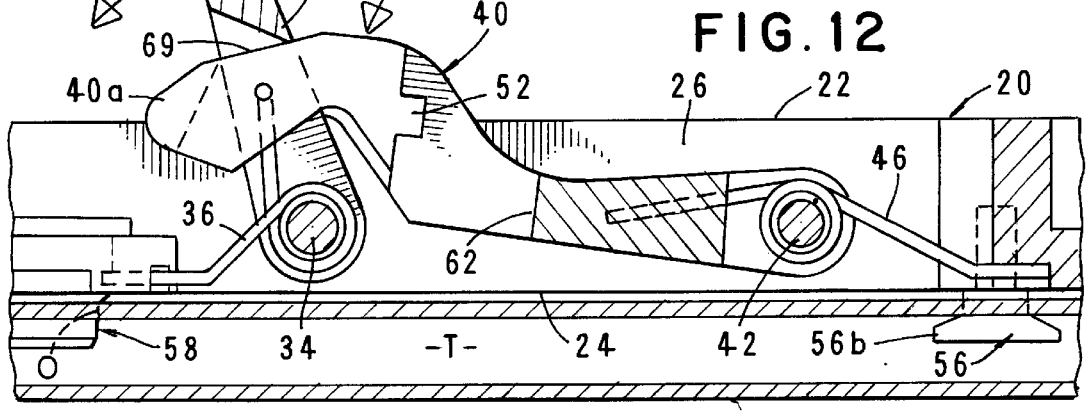

RESTRAINT APPARATUS

BACKGROUND OF THE INVENTION

1. Field of the Invention

The present invention relates generally to an apparatus for restraining cargo carriers such as pallets and containers within aircraft cargo bays. More particularly, the invention concerns a foot-operated restraint device comprising spring-loaded, fully retractable, interlocking pallet restraining pawls that are operable by the foot of the user, but are uniquely constructed so as to positively prevent accidental retraction.

2. Discussion of the Prior Art

Transport of cargo by large commercial aircraft is performed by placing the cargo into containers or onto pallets and then loading the containers or pallets into the cargo bay of the aircraft. For commercial cargo operations, the pallets weigh between about 2,000 lbs. to 13,000 lbs. Provided within the cargo bay are various mechanisms that are used to move pallets into and out of the aircraft and to restrain the pallets for ground and flight operation of the aircraft. Restraint of the pallets in flight is always a key safety requirement. Should any of the pallets shift in flight, a serious and unsafe out of balance condition could occur and serious damage to the cargo bay could result.

A key aspect of the cargo loading system is the pallet lock or end restraint. The purpose of the end restraint is to provide forward, aft and upward restraint of the pallets during flight and to fold down and out of the way during loading and unloading of the pallets. The typical prior art end restraint consists of a base, two transverse shafts connected to the base, an inner and outer pawl rotatably connected to the shafts, torsion springs to urge the pawls into an upward position, and either pins or plungers to connect the assembly to the aircraft floor. The typical end restraint operates by lifting the outer pawl to a vertical position. One of the torsion springs will then lift the inner pawl and snap both pawls into an upright position. The conventional prior art end restraint is collapsed by applying a downward force to the inner pawl. During normal cargo loading and unloading operations, the pawls are collapsed by the ground crew with foot pressure.

The end restraint design as described in the preceding paragraphs and specifically the pawl design dates back to the middle 1960's and a number of different manufacturers currently manufacture and sell these types of devices. As a general rule the pawls of the various manufacturers are interchangeable and it is very common to find in operation an end restraint with an inner pawl manufactured by one company and an outer pawl manufactured by a different company.

It has recently been discovered through testing that under certain conditions, the end restraints can accidentally collapse during flight as a result of a pallet striking the backside of the inner pawl when there is no adjacent forward pallet within the cargo bay. It is the solution of this very serious problem that is at the heart of the present invention.

As will be better understood from the discussion that follows the end restrained apparatus of the present invention comprises a pair of interlocking pawls that are of a unique design so that they cannot be moved into a collapsed position by any initial pressure being exerted on the inner pawl from any direction. The pawls are released by the predetermined, considered sequential action of pushing the outer pawl down to an intermediate position, and then pushing down on the inner pawl. Unless this precise sequence is followed the pawls will remain securely locked in an upright position.

Another approach to solving the problem of accidental collapse of the end restraints is disclosed in U.S. Pat. No. 4,121,789 issued to Lent et al. This patent discloses a cargo latch, particularly for securing pallets or containers within aircraft compartment of the kind comprising two pivotal latch arms movable between an operative position in which one arm engages an item of cargo to be secured and the collapsed position in which the item of cargo is freed. In the Lent et al. construction, a catch element is provided in the base of the device for preventing the inadvertent movement of the latch arms from the operative to the collapsed position U.S. Pat. No. 4,234,278 issued to Harshman et al. also discloses a locking device for securing air cargo units within aircraft cargo bay. The Harshman locking device comprises two pivotal latch arms of a relatively complex configuration only one of which is biased by spring means. The first pawl is held down in the retracted position by the weight of the second pawl. The outer or locking pawl is generally "U" shaped having a pair of spaced apart legs and a foot shaped outer crossmember for engaging the cargo carrier. The legs are pivotally mounted at their innermost extremities by means of pivot pins connected to the side members of the device base. The inner locking pawl has an inner base portion terminating in end portions, which are also pivotally mounted on the base by means of a transversely extending shaft. As the first and second pawls move into their upright position angularly extending surfaces provided on the two legs move into close proximity and function to lock the pawls in the upright position.

As will be understood from the discussion which follows, the apparatus of the present invention comprises a substantial improvement over the prior art and overcomes the various drawbacks of the prior art devices by providing an apparatus that is of a simple construction which is easy and inexpensive to manufacture. The apparatus is highly reliable in operation and includes novel locking means, which positively and effectively prevent accidental collapse of the cargo engaging pawls during flight. The locking means can be released only by the operator following a prescribed sequence of steps, which involves an initial downward movement of the outer pawl to an intermediate position. In this intermediate position, a locking protuberance of one of the pawls has been moved out of engagement with a locking notch on the other pawl so as to permit the sequential downward movement of the inner pawl into the lower position against the urging of a biasing means. When the pawls are in their upstanding position, a second biasing means continuously urges the locking notch into secure engagement with the locking protuberance.

SUMMARY OF THE INVENTION

It is an object of the present invention to provide an aircraft cargo carrier restraint device that is uniquely constructed so that it cannot be accidentally moved from extended, pallet locking position to a retracted position.

Another object of the invention is to provide a restraint device of the aforementioned character which embodies locking pawls of unique design that positively preclude movement of the pawls into a retracted position unless a specific sequence of operation is followed.

Another object of the invention is to provide a restraint device of the character described in the preceding paragraphs in which one of the locking pawls includes a locking notch and the other of the locking pawls includes a locking protuberance which is closely received within the locking notch so as to positively prevent accidental downward movement of the pawls into their lowered position.

Another object of the invention is to provide a restraint device of the aforementioned character in which the inner locking pawl includes a cam surface and in which the outer locking pawl includes a cam surface engaging shoulder which engages the cam surface of the inner pawl in a manner two urge the inner pawl into the lowered position as the outer pawl is moved toward the lowered position.

Another object of the invention is to provide a restraint device of the class described which is lightweight, compact, reliable in use and relatively simple and inexpensive to manufacture.

BRIEF DESCRIPTION OF THE DRAWINGS

FIG. 1A is a generally perspective view of the first pawl of the invention.

FIG. 2 is a top plan view of the device shown in FIG. 1.

FIG. 3 is a side-elevational view of the device shown in FIG. 1 partly broken away to show internal construction.

FIG. 4 is a generally perspective view similar to FIG. 1, but showing the cargo engaging pawls in an upstanding position.

FIG. 4A is a generally perspective view of the second pawl of the invention.

FIG. 5 is a bottom plan view of the restraint device.

FIG. 6 is a side-elevational view of the device showing the locking pawls in an upstanding configuration.

FIG. 7 is an enlarged, cross-sectional view taken along lines 7—7 of FIG. 2.

FIG. 8 is a cross-sectional view taken along lines 8—8 of FIG. 7

FIG. 9 is a cross-sectional view taken along lines 9—9 of FIG. 5.

FIG. 10 is a cross-sectional view taken along lines 10—10 of FIG. 9.

FIG. 11 is a cross-sectional view similar to FIG. 9 but showing the initial movement of the first locking pawl from an upstanding position into an intermediate position.

FIG. 12 is a cross-sectional view similar to FIG. 11 but showing movement of the locking pawls toward the collapsed position.

DESCRIPTION OF THE INVENTION

Figure 1:
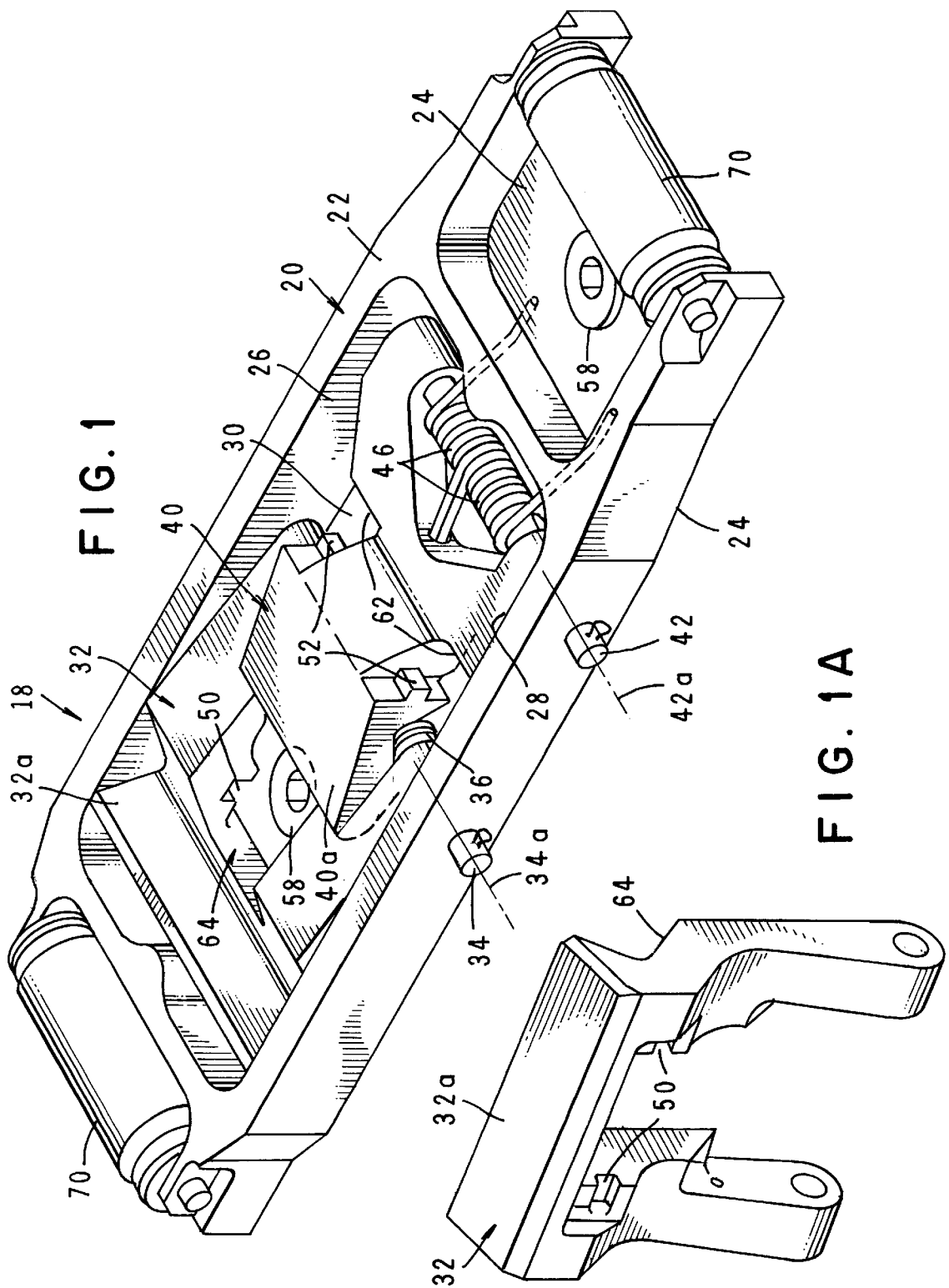
FIG. 1 is a generally perspective view of one form of the cargo restraint device of the invention.

Referring to the drawings and particularly to FIGS. 1 through 6, one form of the foot-operated restraint device of the present invention is there illustrated and generally designated by the numeral 18. The restraint device of the invention is especially designed for use within an aircraft cargo hold of the character that receives cargo containers having lower, outwardly extending flange portions that are gripped by the restraint device in a manner presently to be described. In the present form of the invention, the foot operated restraint device of the invention comprises a frame 20 having spaced-apart top and bottom walls 22 and 24 respectively. The frame also includes side walls 26 and 28 which cooperate to define a central opening 30. A first pawl 32 is pivotally connected to frame 20 for pivotal movement within central opening 30 about a first transverse shaft 34 having an axis 34a (FIG. 1). A first biasing means shown here in the form of a torsion spring 36 functions to yieldably resist movement of first pawl 32 toward the upstanding position shown in FIG. 4.

A second pawl 40 is also pivotally movable within opening 30 about a second transverse shaft 42 having an axis 42a (FIG. 1). Second pawl 40 is movable between the lower position shown in FIG. 1 and the upstanding position shown in FIG. 4. A second biasing means, here provided as a second torsion spring 46, functions to yieldably resist movement of the second pawl 40 toward the lower position of the pawl shown in FIG. 1.

A unique feature of the apparatus of the invention comprises locking means for releasably locking second pawl 40 in the upstanding position shown in FIG. 4. In the present form of the invention, this novel locking means comprises a pair of notches 50 formed in first pawl 32 (FIG. 1A) and a pair of protuberances 52 (FIG. 4A) provided on second pawl 40. As best seen by referring to FIG. 9, when the first and second pawls are in their upstanding locked position protuberances 52 are closely lockably received within the notches 50 provided in first pawl 32.

As is also shown in FIG. 9, first pawl 32 is provided with a cargo flange engagement segment 32a and second pawl 40 is provided with a second flange engagement segment 40a for engaging the flanges of an air cargo container disposed within the cargo bay.

In using the restraint device of the invention, the device is first secured to the floor of the cargo aircraft in a conventional manner. More particularly, as best shown in FIG. 2, connected to the floor of the cargo aircraft are elongated, specially configured tracks "T". Secured to and extending from the bottom wall 24 of frame 20 are a plurality of studs 56 (FIG. 3), each of which has a neck portion 56a and a head portion 56b. The heads of the studs 56 are receivable within openings "O" formed in the track "T" at spaced-apart locations so that the neck portions can slide along slots "S" formed in the track. When the restraint device is aligned with the track so that the heads of the studs 56 can be received within the opening "O", the restraint device can then be moved along the track "T" to a position wherein the heads 56 are out of alignment with the openings "O" thereby locking the restraint device within the track "T". Threaded locking members 58 or plungers which are carried by bottom wall 24 are used to secure the restraint device in place along the track. More particularly, when the restraint device is in the desired position along the track "T", plungers 58 can be threaded downwardly so that they engage an aligned opening "O" provided in the track thereby locking the restraint device in position and preventing it from sliding along the track until plungers 56 are moved out of engagement with the opening "O".

With the restraint devices appropriately affixed to the tracks "T" in the cargo hold, the first pawl 32 is lifted toward the upstanding position against the urging of torsion spring 36. As the first or outer pawl 32 is lifted, torsion spring 46 will simultaneously urge the second or inner pawl 40 into the upright position. As the pawls move into the upright position, torsion spring 46 will urge protuberances 52 to snap into notches 50 thereby locking the pawls in the upstanding position shown in FIGS. 4 and 9. It is to be noted that when the pawls are in the upstanding position, the first biasing means, or torsion spring 46 continuously urges the notches 50 toward the protuberances 52 thereby securely locking the pawls in the upstanding position.

With the pawls in the upstanding position, they can be moved into the collapsed position only by a predetermined sequence of events. The first of these events is to apply a downward pressure on segments 32a of first pawl 32 in the direction of the arrow 59 of FIG. 11. This downward force exerted on pawl 32 will cause the pawl to move downwardly to an intermediate position shown in FIG. 11, wherein the protuberances 52 have been moved out of engagement with the notches 50. It is also to be noted that stop means are provided for preventing the travel of the first pawl 32 beyond the intermediate position shown in FIG. 11. This stop means here comprises a shoulder 62 provided on second pawl 40 (FIG. 9) which shoulder is engaged by a surface 64 provided on first pawl 32 in the manner shown in FIG. 11.

Once the pawls have been moved into the position shown in FIG. 11 and protuberances 52 have cleared notches 50, first pawl 32 can be moved toward a collapsed position by exerting a downward force on the pawl in the direction indicated by the arrow 65 in FIG. 12. As the first pawl 32 is moved toward its downward position, it is to be noted that a shoulder 68 that is provided on first pawl 32 engages a camming surface 69 that is provided on first pawl 40. With this construction, as the first pawl 32 is moved from the upstanding position shown in FIG. 11 toward the lowered position, the camming surface engaging shoulder 68 will engage and ride along camming surface 69 in the manner illustrated in FIG. 12. As shoulder 68 smoothly moves along camming surface 69, second pawl 40 will be urged into its collapsed configuration against the urging of torsion spring 46. When the pawls reach their collapsed position as shown in FIG. 3, first pawl 32 will act upon second pawl 40 to securely restrain the second pawl in the collapsed configuration where it will remain until an upward force is exerted on first pawl 32 tending to move it toward the upstanding position against the urging of spring 46 with the pawls in the collapsed position shown in FIG. 3, cargo containers "C" can be readily rolled over the rollers 70 provided at either end of the restraint device over the collapsed pawls.

As previously mentioned, during operation of the device, when first pawl 32 is moved toward the upstanding position, spring 46 will simultaneously urge second pawl 40 toward the upstanding position and into a location wherein protuberances 52 will snap into notches 50 thereby securely locking the pawls in the upstanding locked configuration. The pawls will remain in the upstanding locked configuration until the sequence of events discussed in the preceding paragraphs takes place. Thereby once again permitting the pawls to be moved into their collapsed position as shown in FIGS. 1 and 3.

Having now described the invention in detail in accordance with the requirements of the patent statutes, those skilled in this art will have no difficulty in making changes and modifications in the individual parts or their relative assembly in order to meet specific requirements or conditions. Such changes and modifications may be made without departing from the scope and spirit of the invention, as set forth in the following claims.

I claim:

1. A restraint device for use in restraining cargo carriers within an aircraft cargo hold, said restraint device comprising:
    (a) a frame having spaced apart sidewalls defining a central opening;
    (b) a first pawl pivotally connected to said frame for pivotal movement about a first axis between an upstanding position and a lowered position;
    (c) a second pawl pivotally connected to said frame for pivotal movement about a second axis between an upstanding position and a lowered position;
    (d) a first biasing means for yieldably resisting movement of said first pawl toward said first pawl upstanding position;
    (e) a second biasing means for yieldably resisting movement of said second pawl toward said second pawl lowered position; and
    (f) locking means for releasably locking said second pawl in said second pawl upstanding position, said locking means comprising a notch formed in said first pawl and a locking protuberance formed on said second pawl, said protuberance being closely received within said notch.

2. The restraint device as defined in claim 1 in which each of said first and second pawls include carrier-restraining segments for engaging the cargo containers when said pawls are in said respective upstanding positions.

3. The restraint device as defined in claim 2 in which said first biasing means urges said notch toward said protuberance when said first and second pawls are in said respective upstanding positions.

4. The restraint device as defined in claim 3 in which when said first and second pawls are in said respective upstanding positions, said notch is movable out of engagement with said protuberance by a downward force exerted on said carrier restraining segment of said first pawl against the urging of said first biasing means sufficient to move said first pawl from said first pawl upstanding position to an intermediate position.

5. The restraining device as defined in claim 4 in which said second pawl is movable toward said second pawl lowered position upon said first pawl being moved into said intermediate position.

6. The restraining device as defined in claim 5 in which said second pawl includes stop means for preventing the travel of said first pawl beyond said intermediate position upon a downward force being exerted on said carrier restraining segment of said first pawl.

7. The restraining device as defined in claim 5 in which said carrier restraining segment of said second pawl includes a camming surface and in which said first pawl includes a camming surface engaging shoulder for engaging said camming surface to move said second pawl toward said second pawl lowered position against the urging of said second biasing means.

8. A foot operated restraint device for use in restraining adjacent air cargo carriers within an aircraft cargo hold having a floor provided with spaced apart tracks, the air cargo containers having lower, outwardly extending flange portions, said restraint device comprising:
    (a) a frame having spaced apart top and bottom walls and spaced apart side walls defining a central opening;
    (b) a first pawl pivotally connected to said frame for pivotal movement within said central opening about a first axis between an upstanding position and a lowered portion;
    (c) a first biasing means for yieldably resisting movement of said first pawl toward said upstanding position;
    (d) a second pawl pivotally connected to said frame for pivotal movement within said central opening between an upstanding position and a lowered position;
    (f) second biasing means for yieldably resisting movement of said second pawl toward said second pawl lowered position; and (g) locking means for releasably locking said second pawl in said second pawl upstanding position, said locking means comprising a notch formed in said first pawl and a locking protuberance formed on said second pawl, said locking protuberance being closely receivable within said notch.

9. A restraint device as defined in claim 8 in which said first pawl pivots about said first axis and in which said second pawl pivots about a second axis longitudinally spaced from said first axis.

10. A restraint device as defined in claim 8 in which each of said first and second pawls is provided with a cargo flange engagement segment for engaging a flange of an air cargo carrier.

11. A restrain device as defined in claim 10 in which said first biasing means continuously urges said notch toward protuberance when said first and second pawls are in said respective upstanding positions.

12. The restraint device as defined in claim 11 in which when said first and second pawls are in said respective upstanding positions, said notch is movable out of engagement with said protuberance by a downward force exerted on said carrier restraining segment of said first pawl against the urging of said first biasing means sufficient to move said first pawl from said first pawl upstanding position to an intermediate position.

13. The restraining device as defined in claim 12 in which said second pawl is movable toward said second pawl lowered position upon said first pawl being moved into said intermediate position.

14. The restraining device as defined in claim 13 in which said second pawl includes stop means for preventing the travel of said first pawl beyond said intermediate position upon a downward force being exerted on said carrier restraining segment of said first pawl.

15. The restraining device as defined in claim 14 in which said carrier restraining segment of said second pawl includes a camming surface and in which said first pawl includes a camming surface engaging shoulder for engaging said camming surface upon movement of said first pawl from said first pawl upstanding position toward said first pawl lowered position.

16. A foot operated restraint device for use in restraining adjacent air cargo carriers within an aircraft cargo hold having a floor provided with spaced apart tracks, the air cargo containers having lower, outwardly extending flange portions, said restraint device comprising:

(a) a frame having spaced apart top and bottom walls and spaced apart side walls defining a central opening;

(b) a first pawl pivotally connected to said frame for pivotal movement within said central opening about a first axis between an upstanding position and a lowered portion, said first pawl having a cargo flange engagement segment for engaging a flange of an air cargo carrier, said segment having a cam surface engaging shoulder;

(c) a first spring connected to said frame for yieldably resisting movement of said first pawl toward said upstanding position;

(d) a second pawl pivotally connected to said frame for pivotal movement within said central opening between an upstanding position and a lowered position, said second pawl having a cargo flange engagement segment for engaging the flange of an air cargo carrier, said flange engagement segment of said second pawl having a curved cam surface engagable by said cam surface engaging shoulder;

(f) a second spring connected to said frame for yieldably resisting movement of said second pawl toward said second pawl lowered position; and (g) locking means for releasably locking said second pawl in said second pawl upstanding position, said locking means comprising a notch formed in said first pawl and a locking protuberance formed on said second pawl, said locking protuberance being closely receivable within said notch.

17. A restraint device as defined in claim 16 in which said first biasing means continuously urges said notch toward said protuberance when said first and second pawls are in said respective upstanding positions.

18. The restraint device as defined in claim 17 in which when said first and second pawls are in said respective upstanding positions, said notch is movable out of engagement with said protuberance by a downward force exerted on said carrier restraining segment of said first pawl against the urging of said first biasing means sufficient to move said first pawl from said first pawl upstanding position to an intermediate position.

19. The restraining device as defined in claim 18 in which said second pawl is movable toward said second pawl lowered position upon said first pawl being moved into said intermediate position.

20. The restraining device as defined in claim 19 in which said second pawl includes stop means for preventing the travel of said first pawl beyond said intermediate position upon a downward force being exerted on said carrier restraining segment of said first pawl.

* * * * *